UNITED STATES PATENT OFFICE.

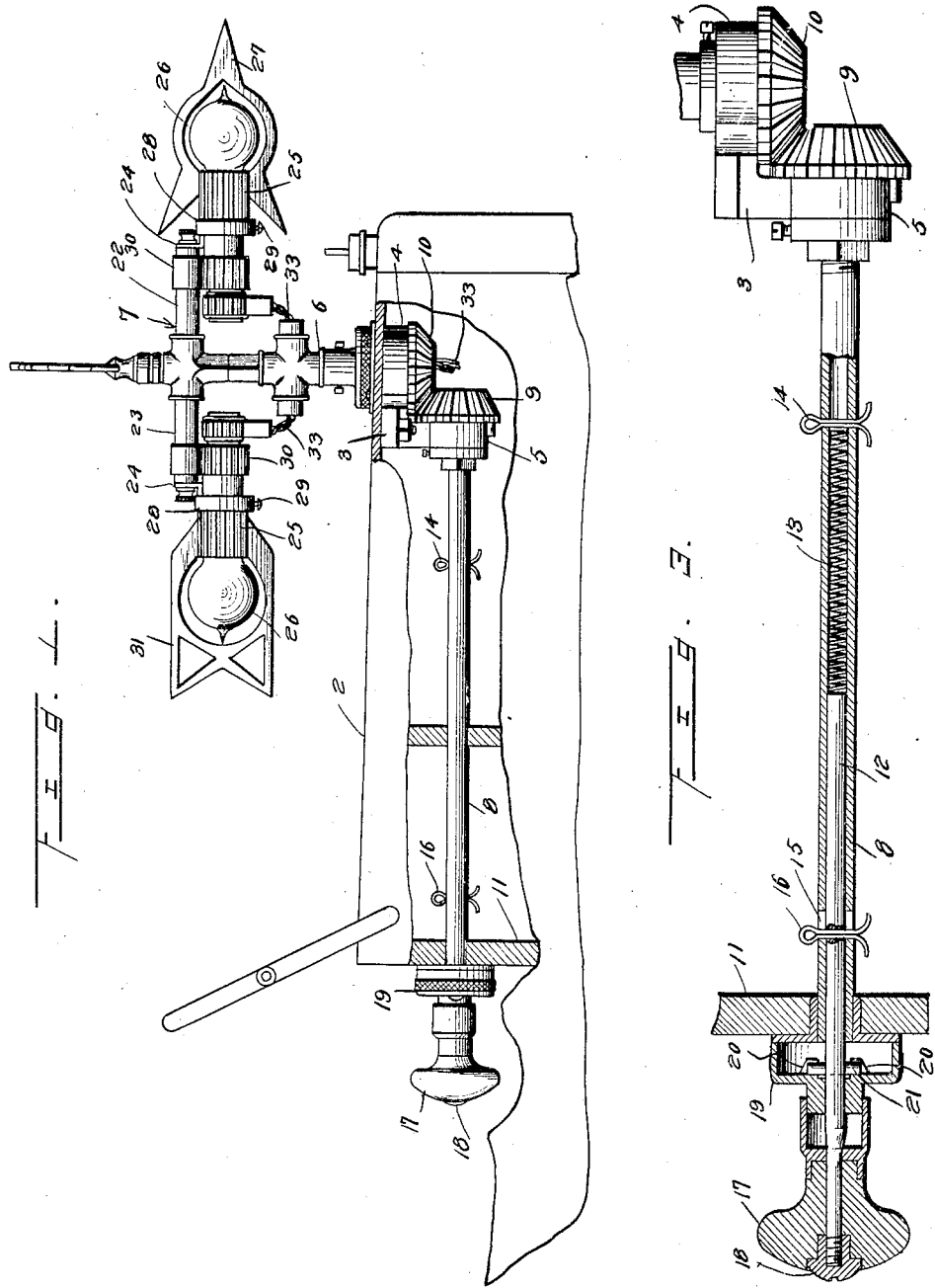

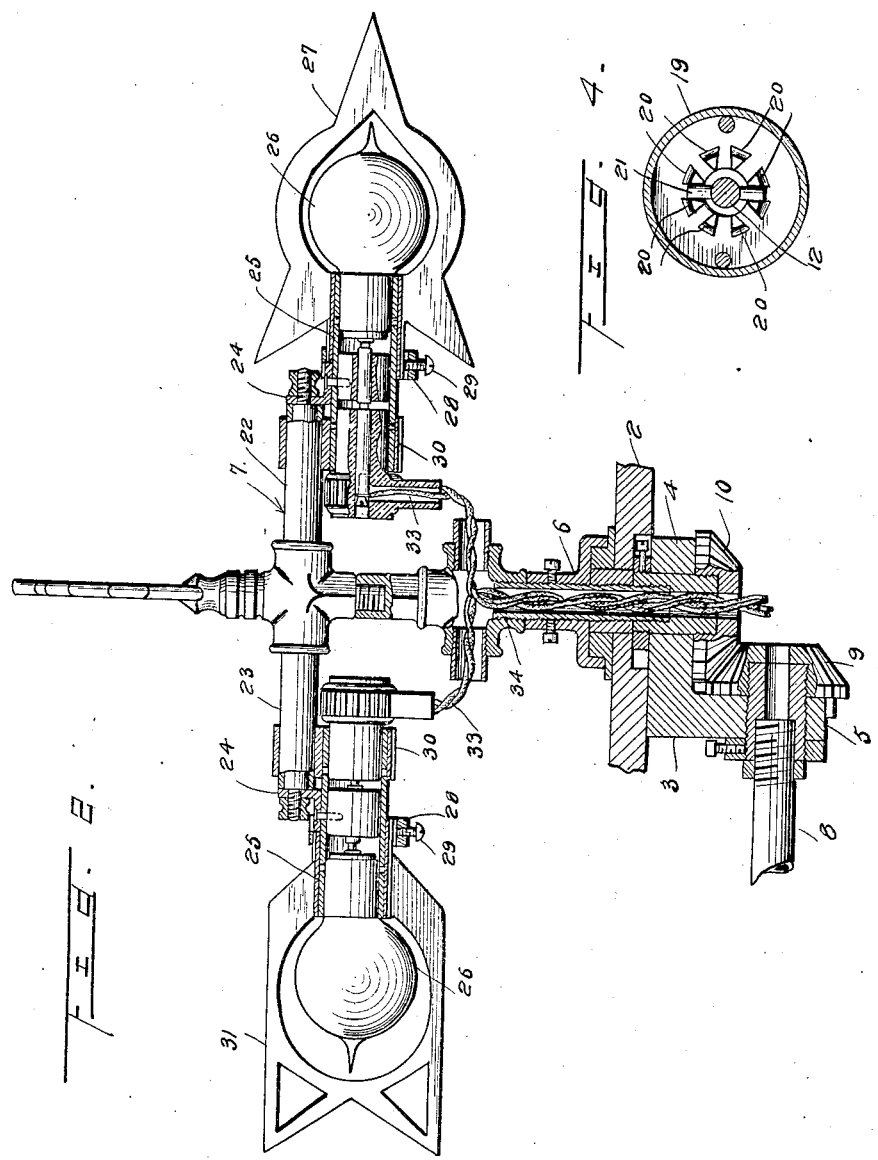

BURTON V. VOSBURGH, OF CHARLOTTE, MICHIGAN.

DIRECTION-INDICATOR.

1,363,936.  Specification of Letters Patent.  Patented Dec. 28, 1920.

Application filed August 18, 1920. Serial No. 404,386.

*To all whom it may concern:*

Be it known that I, BURTON V. VOSBURGH, a citizen of the United States, residing at Charlotte, in the county of Eaton and State of Michigan, have invented certain new and useful Improvements in Direction-Indicators; and I do hereby declare the following to be a full, clear, and exact description of the invention, such as will enable others skilled in the art to which it appertains to make and use the same.

This invention relates to new and useful improvements in direction indicators and has for its primary object the provision of a signal adapted to be mounted on the forward end of an automobile and is capable of being readily swung in either direction to indicate to traffic which direction a turn is to be made by the respective automobile.

Another object of this invention is the provision of an operating means for the signal that extends into convenient reach of the operator, so that said signal may be easily and quickly moved into either of its signaling positions or into a non-signaling position and which means is adapted to lock the signal in either of its positions when released by the operator.

A further object of this invention is the provision of a direction indicator of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts, as will be hereinafter more fully described and claimed.

For a complete understanding of my invention, reference is to be had to the following description and accompanying drawings, in which:—

Figure 1 is a fragmentary view of an automobile illustrating a direction indicator applied thereto and constructed in accordance with my invention, Fig. 2 is a vertical sectional view illustrating the signal, Fig. 3 is a sectional view illustrating the operating means, Fig. 4 is a detail view illustrating means for locking the signal in its various positions.

Referring in detail to the drawings, the numeral 1 indicates an automobile which is provided with the usual hood 2 adapted to overlie the engine of the automobile and to which my invention is applied. A bracket 3 is secured to the under face of the hood 2 adjacent the radiator and is provided with journal portions 4 and 5. The journal portions 4 rotatably support a vertically disposed shaft 6 that extends through the hood 2 and carries the signal 7.

The journal portions 5 rotatably support the forward end of a hollow actuating shaft 8 and which has secured to its forward end a bevel gear 9 connected with a bevel gear 10 secured to the lower end of the shaft 6. The actuating shaft 8 extends rearwardly under the hood 2 and has its rear end rotatably supported by the instrument board 11 of the automobile 1. The actuating shaft 8 slidably receives a shaft 12 which projects beyond the rear end of said shaft 8 and has its forward end disposed against an expansion spring 13 located in the shaft 8. The expansion spring 13 is of the coil type and is interposed between the forward end of the shaft 12 and a stop 14 located in the shaft 8. The shaft 8 adjacent its rear end is provided with oppositely disposed slots 15 to receive a cotter key or pin 16 that extends through the shaft 12 for limiting the forward and rearward movement of the shaft 12 as well as establishing a driving connection between the shafts. The rear end of the shaft 12 has mounted thereon a finger grip 17 and which is secured to said shaft by means of a fastening element 18 which has threaded engagement with the end of the shaft 12. A locking casing 19 is mounted on the instrument board 11 and receives the shaft 12 and has a series of spaced and circularly arranged teeth 20 which are adapted to be engaged by a pin 21 carried by the shaft 12 for holding the shaft against rotation. When it is desired to move the signal into any of its signaling positions, or into a non-signaling position from any one of the former named positions, the operator pushes on the finger grip 17 disengaging the pin 21 from the teeth 20 and turning the finger grip in the desired direction, the signal 7 will be swung in an opposite direction to indicate a certain turn either to the left or right from a straight course and as soon as the operator releases the finger grip 17, the spring 13 slides the shaft 12 rearwardly causing the pin 21 to engage the teeth 20 thus locking the signal 7 in its position then occupied.

The signal 7 consists of the shaft 6 having forwardly and rearwardly extending arms 22 and 23. Brackets 24 are secured to the ends of the arms 22 and 23 by means of nuts and are formed on electric lamp sockets 25 which are disposed horizontally and forwardly and rearwardly of the shaft 6 and support electric lamps 26. The electric lamp located forwardly is preferably colored red while the electric lamp located rearwardly of the shaft 6 is preferably coated blue. An arrow head 27 is mounted upon the forward electric lamp socket 25 and is of skeleton formation and receives the forward electric lamp 26 and is retained in engagement with its respective electric lamp socket by means of a collar 28 provided with a set screw 29. The electric lamp sockets are further supported to the arms 22 and 23 by members 30. The rear electric lamp socket 25 is provided with the tail portion 31 of the arrow and is of skeleton formation to receive the rear electric light 26. The tail portion 31 is secured to the rear electric lamp socket by means of a collar similar to the collar 28. The electric lamp sockets 25 have conductors 33 connected thereto which extend into the shaft 6 by the tubes 34 and thence downwardly through the shaft and gear 10 for connection with the usual illuminating system of the automobile.

While I have shown and described the preferred embodiment of the invention, it will be understood that minor changes in construction, combination, and arrangement of parts may be made without departing from the spirit and scope of the invention as claimed.

Having thus described my invention what I claim is:—

1. A direction indicator comprising a support, a shaft journaled in said support, forwardly and rearwardly extending arms formed on said shaft, electric lamp sockets carried by said arms, electric lamps located in said sockets, tail and head portions of arrows secured to the sockets and of skeleton formation to receive the electric lamps, and means connected to the shaft for turning the same in either direction.

2. A direction indicator comprising a bracket, journal portions formed on said bracket, a signal journaled in one of said bearing portions, a gear secured to said signal, a hollow shaft journaled in the other bearing portion, a gear secured to the hollow shaft and in mesh with the first named gear, a second shaft mounted in the hollow shaft, a slidable driving connection between said shaft, an expansion spring in the first named shaft and bearing against the second named shaft, a finger grip secured to the second shaft, a pin secured to the second shaft, a locking casing secured to the automobile and receiving the second shaft, and a series of teeth formed in the locking casing and adapted to be engaged by the pin for holding the signal in various positions.

In testimony whereof I affix my signature in presence of two witnesses.

BURTON V. VOSBURGH.

Witnesses:
Roy E. Moore,
Mary L. Dann.